(12) United States Patent
Slovick et al.

(10) Patent No.: US 9,578,267 B2
(45) Date of Patent: Feb. 21, 2017

(54) CAMERAS AND METHODS WITH DATA PROCESSING, MEMORIES, AND AN IMAGE SENSOR WITH MULTIPLE DATA PORTS

(71) Applicant: Alexander Krymski, Sunny Isles Beach, FL (US)

(72) Inventors: Alexey Slovick, Moscow (RU); Alexander Krymski, Sunny Isles Beach, FL (US)

(73) Assignee: Alexander Krymski, Sunny Isles Beach, FL (US)

( * ) Notice: Subject to any disclaimer, the term of this patent is extended or adjusted under 35 U.S.C. 154(b) by 31 days.

(21) Appl. No.: 14/458,151

(22) Filed: Aug. 12, 2014

(65) Prior Publication Data

US 2015/0181148 A1   Jun. 25, 2015

Related U.S. Application Data

(60) Provisional application No. 61/920,415, filed on Dec. 23, 2013.

(51) Int. Cl.
*H04N 5/378* (2011.01)

(52) U.S. Cl.
CPC ..................... *H04N 5/378* (2013.01)

(58) Field of Classification Search
CPC .............................. H04N 5/772; H04N 5/378
USPC .................................................. 348/231.99
See application file for complete search history.

(56) References Cited

U.S. PATENT DOCUMENTS

| | | | |
|---|---|---|---|
| 6,466,265 B1 * | 10/2002 | Lee et al. | 348/308 |
| 6,870,565 B1 * | 3/2005 | Blerkom et al. | 348/294 |
| 6,989,589 B2 * | 1/2006 | Hammadou et al. | 257/685 |
| 7,205,522 B2 | 4/2007 | Krymski | |
| 7,336,214 B2 | 2/2008 | Krymski | |
| 7,400,279 B2 | 7/2008 | Krymski | |
| 7,488,928 B2 * | 2/2009 | Krymski | 250/208.1 |
| 7,599,583 B2 * | 10/2009 | Levinson | 385/14 |
| 7,659,925 B2 * | 2/2010 | Krymski | 348/222.1 |
| 7,804,438 B2 | 9/2010 | Krymski | |
| 7,876,362 B2 * | 1/2011 | Krymski | 348/222.1 |
| 7,990,436 B2 * | 8/2011 | Mabuchi | 348/231.99 |
| 8,035,701 B2 * | 10/2011 | Han | 348/231.99 |

(Continued)

OTHER PUBLICATIONS

"AM41V4, AM41V4ZC 4MPIX 500FPS CMOS Image Sensor," Alexima, dated Jun. 5, 2012; 32 pages.

*Primary Examiner* — Roberto Velez
*Assistant Examiner* — Cynthia Segura
(74) *Attorney, Agent, or Firm* — Foley & Lardner LLP

(57) ABSTRACT

A camera includes a first processing device, a second processing device, and an image sensor that has a first plurality of ports connected to the first processing device and a second plurality of ports connected to the second processing device. A method includes providing first data from the first plurality of ports of the image sensor to the first processing device, and providing second data from the second plurality of ports of the image sensor to the second processing device. Another camera includes a first memory, a second memory, and an image sensor having a first plurality of ports connected to the first memory and a second plurality of ports connected to the second memory. A method includes providing first data from the first plurality of ports to the first memory and providing second data from the second plurality of ports to the second memory.

42 Claims, 7 Drawing Sheets

(56) References Cited

U.S. PATENT DOCUMENTS

| | | | |
|---|---|---|---|
| 8,041,003 B2* | 10/2011 | Astley et al. | 378/19 |
| 8,159,589 B2* | 4/2012 | Lim et al. | 348/311 |
| 8,174,603 B2 | 5/2012 | Krymski | |
| 8,310,578 B2 | 11/2012 | Krymski | |
| 8,723,093 B2 | 5/2014 | Krymski | |
| 8,946,610 B2* | 2/2015 | Iwabuchi et al. | 250/208.1 |
| 9,223,407 B2* | 12/2015 | Hsu | H04N 5/04 |
| 2003/0043089 A1* | 3/2003 | Hanson et al. | 345/55 |
| 2005/0012836 A1* | 1/2005 | Guidash | 348/302 |
| 2005/0237407 A1* | 10/2005 | Bae | 348/308 |
| 2005/0253947 A1* | 11/2005 | Kim et al. | 348/308 |
| 2007/0076109 A1* | 4/2007 | Krymski | 348/300 |
| 2008/0042046 A1* | 2/2008 | Mabuchi | H01L 27/14634 250/208.1 |
| 2008/0258042 A1* | 10/2008 | Krymski | 250/208.1 |
| 2009/0009630 A1* | 1/2009 | Chari et al. | 348/231.99 |
| 2010/0194948 A1* | 8/2010 | Murakami | H04N 3/1568 348/302 |
| 2011/0025699 A1* | 2/2011 | Ogawa | H01L 25/18 345/531 |
| 2011/0211080 A1* | 9/2011 | Silverbrook | B41J 2/14 348/207.2 |
| 2012/0133807 A1* | 5/2012 | Wu et al. | 348/272 |
| 2012/0266004 A1* | 10/2012 | Saito | 713/324 |
| 2013/0027594 A1* | 1/2013 | Krymski | 348/300 |
| 2013/0042132 A1* | 2/2013 | Park et al. | 713/324 |
| 2013/0128086 A1* | 5/2013 | Juen | H01L 27/14636 348/302 |
| 2013/0215302 A1* | 8/2013 | Ueno | H03M 1/0863 348/300 |
| 2014/0292840 A1* | 10/2014 | Harada | G09G 3/3426 345/694 |
| 2015/0304583 A1* | 10/2015 | Lee | H04N 5/76 348/300 |
| 2015/0334322 A1* | 11/2015 | Fujioka | H01L 27/14812 348/322 |

* cited by examiner

CAMERAS AND METHODS WITH DATA PROCESSING, MEMORIES, AND AN IMAGE SENSOR WITH MULTIPLE DATA PORTS

CROSS-REFERENCE TO RELATED PATENT APPLICATIONS

This application claims priority from U.S. Provisional Patent App. Ser. No. 61/920,415, filed Dec. 23, 2013, the entire contents of which are incorporated by reference herein.

BACKGROUND

1. Field of the Invention

Embodiments of the present invention relate generally to cameras and methods and, in specific embodiments, to cameras and methods with an image sensor, data processing, and memory.

2. Related Art

Cameras have found wide application as consumer and industrial devices, and the development of image sensors has enabled an explosion in a number of digital cameras used for work and entertainment. FIG. 1 illustrates the architecture of a related art high speed camera 60 with an image sensor 62, a high-end Field-Programmable Gate Array (FPGA) 64 configured to perform on-the-fly image pre-processing, a memory 66, and output interfaces 68. The image sensor 62 samples light intensity of a scene being imaged and outputs digital pixel values from output data ports 63.

High speed digital Complementary Metal-Oxide-Semiconductor (CMOS) image sensors typically have multiple output data ports. An example of a high speed CMOS image sensor is the AM41V4™ image sensor by Alexima, which has 4 ports in each sensor corner that are 10 bits each for a total of 16 ports at 10 bits each or 160 digital outputs. The AM41V4™ image sensor is described in the document entitled "AM41V4, AM41V4ZC 4MPIX 500FPS CMOS Image Sensor," by Alexima, dated Jun. 5, 2012. Some image sensors may have digital output ports on only one side of the image sensor, while other image sensors may have digital output ports split between two sides of the image sensors, and yet other image sensors may have digital output ports in each corner (as in the image sensor 62 in FIG. 1). Some image sensors may have as many groups of ports as there are memory blocks in the image sensors.

Each of the ports 63 of the image sensor 62 is connected to a corresponding pin of the high-end FPGA 64. In a typical implementation of the high speed camera 60, all data from all of the parallel sensor ports 63 are imported into the one large, wide interface, high processing power, high cost, high-end FPGA 64, which may be, for example, a Virtex-6™ FPGA by Xilinx Inc. or a Stratix IV™ FPGA by Altera Corporation. The high-end FPGA is also connected to the memory 66 by a connection 65 and to the output interfaces 68 by a connection 67. During an image capture operation of the camera 60, high speed image data from the image sensor 62 is written by the high-end FPGA 64 into the memory 66 up to its full capacity. Then, after the image has been captured, a retrieving of the data from the memory 66 by the high-end FPGA 64 may be done at slow speed to be provided to the output interfaces 68, as the commercially available output interfaces 68 from the camera, such as Gigabit Ethernet, Universal Serial Bus (USB)-2, or USB-3, are relatively slow interfaces.

SUMMARY OF THE DISCLOSURE

A camera in accordance with an embodiment includes a first processing device, a second processing device, and an image sensor that has a first plurality of ports connected to the first processing device and a second plurality of ports connected to the second processing device. In various embodiments, the first processing device is a field-programmable gate array. Also, in various embodiments, the second processing device is a field-programmable gate array. In some embodiments, the first processing device is an application specific integrated circuit, and in some embodiments, the second processing device is an application specific integrated circuit. In some embodiments, the first processing device is located to an opposite side of the image sensor from a side to which the second processing device is located.

In various embodiments, a first memory is connected to the first processing device, and a second memory is connected to the second processing device. In some embodiments, the first processing device is configured to perform image data pre-processing on first data received from the first plurality of ports of the image sensor and to provide first processed data resulting from the image data pre-processing of the first data to the first memory. Also, in some embodiments, the second processing device is configured to perform image data pre-processing on second data received from the second plurality of ports of the image sensor and to provide second processed data from the image data pre-processing of the second data to the second memory. In various embodiments, the camera further includes a processing device that is connected to the first memory and to the second memory and to output interfaces of the camera. In some embodiments, the processing device is configured to retrieve data from the first memory and the second memory and to provide the retrieved data to the output interfaces of the camera.

In various embodiments the camera further includes a third processing device and a fourth processing device, and the image sensor further includes a third plurality of ports connected to the third processing device and a fourth plurality of ports connected to the fourth processing device. In some embodiments, the first plurality of ports are located at a top-left portion of the image sensor, the second plurality of ports are located at a top-right portion of the image sensor, the third plurality of ports are located at a bottom-left portion of the image sensor, and the fourth plurality of ports are located at a bottom-right portion of the image sensor.

In various embodiments, the camera further includes a first memory connected to the first processing device, a second memory connected to the second processing device, a third memory connected to the third processing device, and a fourth memory connected to the fourth processing device. In some embodiments, the first processing device is configured to perform image data pre-processing on first data received from the first plurality of ports of the image sensor and to provide first processed data resulting from the image data pre-processing of the first data to the first memory, the second processing device is configured to perform image data pre-processing on second data received from the second plurality of ports of the image sensor and to provide second processed data resulting from the image data pre-processing of the second data to the second memory, the third processing device is configured to perform image data pre-processing on third data received from the third plurality of ports of the image sensor and to provide third processed data resulting from the image data pre-processing of the third data to the third memory, and the fourth processing device is configured to perform image data pre-processing on fourth data received from the fourth plurality of ports of the image sensor and to provide fourth processed data resulting from the image data pre-processing of the fourth data to the fourth memory.

In various embodiments, the camera further includes a processing device connected to the first memory and to the second memory and to the third memory and to the fourth memory and to output interfaces of the camera. In some embodiments, the processing device is configured to retrieve data from the first memory and the second memory and the third memory and the fourth memory and to provide the retrieved data to the output interfaces of the camera. Also, in some embodiments, the first processing device comprises a field-programmable gate array with fewer number of pins than the number of ports of the image sensor, the second processing device comprises a field-programmable gate array with fewer number of pins than the number of ports of the image sensor, the third processing device comprises a field-programmable gate array with fewer number of pins than the number of ports of the image sensor, and the fourth processing device comprises a field-programmable gate array with fewer number of pins than the number of ports of the image sensor.

A method in a camera in accordance with an embodiment includes providing first data from a first plurality of ports of an image sensor to a first processing device, and providing second data from a second plurality of ports of the image sensor to a second processing device. In various embodiments, the method further includes performing, by the first processing device, image data pre-processing on the first data to provide first processed data, and performing, by the second processing device, image data pre-processing on the second data to provide second processed data. Also, in some embodiments, the method further includes providing the first processed data from the first processing device to a first memory, and providing the second processed data from the second processing device to a second memory. In some embodiments, the method further includes retrieving, by a processing device, the first processed data from the first memory, and retrieving, by the processing device, the second processed data from the second memory.

In various embodiments, the method further includes providing third data from a third plurality of ports of the image sensor to a third processing device, and providing fourth data from a fourth plurality of ports of the image sensor to a fourth processing device. In some embodiments, the method further includes performing, by the first processing device, image data pre-processing on the first data to provide first processed data, performing, by the second processing device, image data pre-processing on the second data to provide second processed data, performing, by the third processing device, image data pre-processing on the third data to provide third processed data, and performing, by the fourth processing device, image data pre-processing on the fourth data to provide fourth processed data.

In some embodiments, the method further includes providing the first processed data from the first processing device to a first memory, providing the second processed data from the second processing device to a second memory, providing the third processed data from the third processing device to a third memory, and providing the fourth processed data from the fourth processing device to a fourth memory.

Also, in some embodiments, the method further includes retrieving, by a processing device, the first processed data from the first memory, retrieving, by the processing device, the second processed data from the second memory, retrieving, by the processing device, the third processed data from the third memory, and retrieving, by the processing device, the fourth processed data from the fourth memory.

A camera in accordance with an embodiment includes a first memory, a second memory, and an image sensor having a first plurality of ports connected to the first memory and a second plurality of ports connected to the second memory. In various embodiments, the first memory comprises a synchronous dynamic random access memory, and the second memory comprises a synchronous dynamic random access memory. In some embodiments, the first plurality of ports of the image sensor comprise stub series terminated logic output drivers for writing data directly to the first memory, and the second plurality of ports of the image sensor comprise stub series terminated logic output drivers for writing data directly to the second memory.

In various embodiments, the first memory is located to an opposite side of the image sensor from a side to which the second memory is located. In some embodiments, the camera further includes a processing device connected to the first memory and to the second memory and to output interfaces of the camera. In various embodiments, the camera further includes a third memory and a fourth memory, and the image sensor further has a third plurality of ports connected to the third memory and a fourth plurality of ports connected to the fourth memory. In some embodiments, the camera further includes a processing device configured to retrieve data from the first memory and the second memory and the third memory and the fourth memory and to provide the retrieved data to output interfaces of the camera.

A method in a camera in accordance with an embodiment includes providing first data from a first plurality of ports of an image sensor to a first memory and providing second data from a second plurality of ports of the image sensor to a second memory. In various embodiments, providing the first data includes providing the first data from the first plurality of ports of the image sensor using stub series terminated logic output drivers directly to the first memory. In some embodiments, the method further includes providing third data from a third plurality of ports of the image sensor to a third memory and providing fourth data from a fourth plurality of ports of the image sensor to a fourth memory. Also, in some embodiments, the method further includes retrieving by a processing device of the camera the first data from the first memory, retrieving by the processing device the second data from the second memory, retrieving by the processing device the third data from the third memory, and retrieving by the processing device the fourth data from the fourth memory.

DETAILED DESCRIPTION OF PREFERRED EMBODIMENTS

Figure 2:
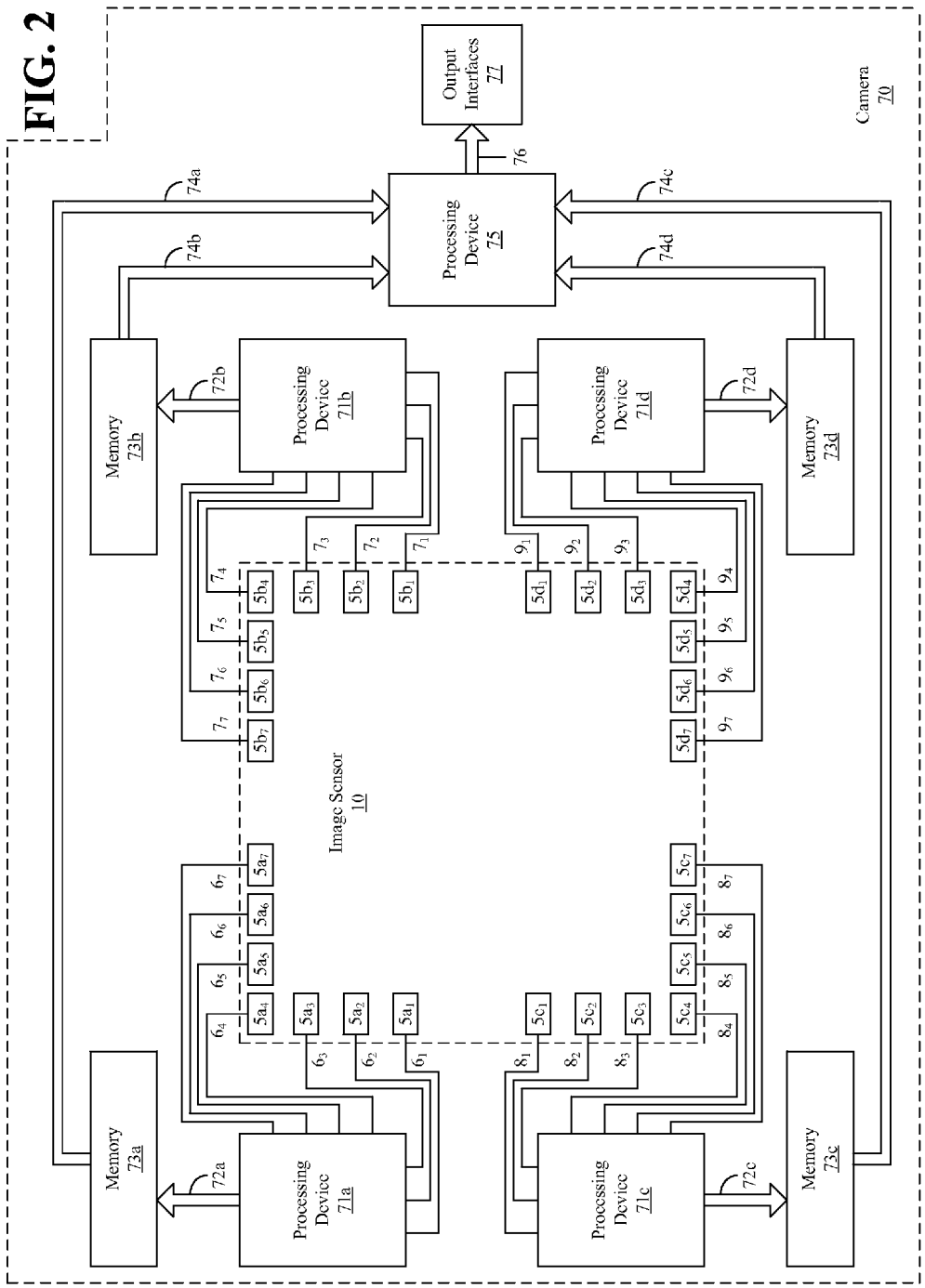
FIG. 2 illustrates a camera in accordance with an embodiment.

FIG. 2 illustrates a camera 70 in accordance with an embodiment. The camera 70 includes an image sensor 10, a processing device 71a, a processing device 71b, a processing device 71c, a processing device 71d, a memory 73a, a memory 73b, a memory 73c, a memory 73d, a processing device 75, and output interfaces 77. The image sensor 10 has a first plurality of ports $5a_1, 5a_2, 5a_3, 5a_4, 5a_5, 5a_6, 5a_7$, that are connected to the processing device 71a by corresponding connections $6_1, 6_2, 6_3, 6_4, 6_5, 6_6, 6_7$, respectively. The image sensor 10 has a second plurality of ports $5b_1, 5b_2, 5b_3, 5b_4, 5b_5, 5b_6, 5b_7$, that are connected to the processing device 71b by corresponding connections $7_1, 7_2, 7_3, 7_4, 7_5, 7_6, 7_7$, respectively. The image sensor 10 has a third plurality of ports $5c_1, 5c_2, 5c_3, 5c_4, 5c_5, 5c_6, 5c_7$, that are connected to the processing device 71c by corresponding connections $8_1, 8_2, 8_3, 8_4, 8_5, 8_6, 8_7$, respectively. The image sensor 10 has a fourth plurality of ports $5d_1, 5d_2, 5d_3, 5d_4, 5d_5, 5d_6, 5d_7$, that are connected to the processing device 71d by corresponding connections $9_1, 9_2, 9_3, 9_4, 9_5, 9_6, 9_7$, respectively.

The processing device 71a is connected to the memory 73a by a connection 72a. The processing device 71b is connected to the memory 73b by a connection 72b. The processing device 71c is connected to the memory 73c by a connection 72c. The processing device 71d is connected to the memory 73d by a connection 72d. The memory 73a is connected to the processing device 75 by a connection 74a. The memory 73b is connected to the processing device 75 by a connection 74b. The memory 73c is connected to the processing device 75 by a connection 74c. The memory 73d is connected to the processing device 75 by a connection 74d. The processing device 75 is connected to the output interfaces 77 by a connection 76. In various embodiments, each of the connections $6_1, 6_2, 6_3, 6_4, 6_5, 6_6, 6_7, 7_1, 7_2, 7_3, 7_4, 7_5, 7_6, 7_7, 8_1, 8_2, 8_3, 8_4, 8_5, 8_6, 8_7, 9_1, 9_2, 9_3, 9_4, 9_5, 9_6, 9_7, 72a, 72b, 72c, 72d, 74a, 74b, 74c, 74d$, and 76 comprises, for example, one or more wires or circuit board connections, or the like.

Figure 3:
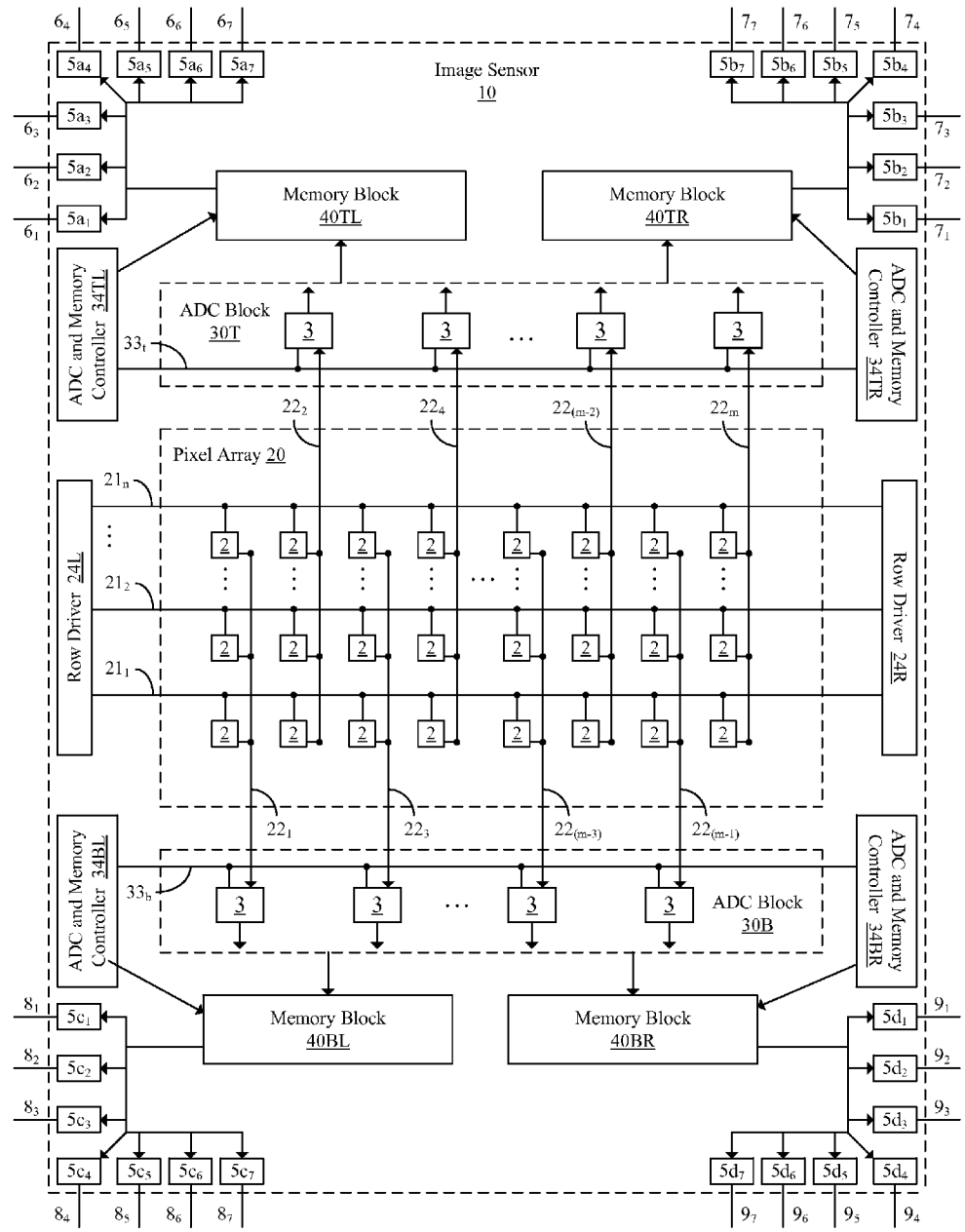
FIG. 3 illustrates a block diagram of an embodiment of an image sensor.

FIG. 3 illustrates a block diagram of an embodiment of the image sensor 10. In the embodiment shown in FIG. 3, the image sensor 10 includes a pixel array 20, a left row driver 24L, a right row driver 24R, a top analog-to-digital conversion (ADC) block 30T, a bottom ADC block 30B, a top/left memory block 40TL, a top/right memory block 40TR, a bottom/left memory block 40BL, a bottom/right memory block 40BR, a top/left ADC and memory controller 34TL, a top/right ADC and memory controller 34TR, a bottom/left ADC and memory controller 34BL, a bottom/right ADC and memory controller 34BR, the first plurality of ports $5a_1, 5a_2, 5a_3, 5a_4, 5a_5, 5a_6, 5a_7$, the second plurality of ports $5b_1, 5b_2, 5b_3, 5b_4, 5b_5, 5b_6, 5b_7$, the third plurality of ports $5c_1, 5c_2, 5c_3, 5c_4, 5c_5, 5c_6, 5c_7$, and the fourth plurality of ports $5d_1, 5d_2, 5d_3, 5d_4, 5d_5, 5d_6, 5d_7$. In various embodiments, the image sensor 10 may be, for example, a high speed complimentary metal oxide semiconductor (CMOS) image sensor, or the like.

The pixel array 20 includes a plurality of pixels 2. In various embodiments, the pixel 2 is a four transistor (4T) pixel. In various embodiments, the pixel 2 may be another type of pixel, such as a three transistor (3T) pixel, a five transistor (5T) pixel, or the like. With reference to FIG. 3, the plurality of pixels 2 in the pixel array 20 are arranged in a plurality of rows and a plurality of columns. For example, the pixels 2 in the pixel array 20 may be arranged in n rows and m columns, where n and m are integer values. Each pixel 2 of the pixel array 20 is configured to sample light intensity and to provide a corresponding analog pixel signal based on the sampled light intensity. The pixel array 20 further includes a plurality of column readout lines $22_1, 22_2, 22_3, 22_4, \ldots, 22_{(m-3)}, 22_{(m-2)}, 22_{(m-1)}, 22_m$ for reading out signals from the pixels 2 in the corresponding columns. In the embodiment illustrated in FIG. 3, there is one column readout line per each column of pixels 2 in the pixel array 20. In various other embodiments, there may be two or more column readout lines per each column of pixels 2 in the pixel array 20.

The left row driver 24L and the right row driver 24R are configured to supply control signals to the plurality of pixels 2 in the pixel array 20. In various embodiments the left row driver 24L is connected to the pixels 2 in each row of the plurality of rows of the pixel array 20 by a corresponding one or more control lines for the row. For example, the left row driver 24L is connected to the pixels 2 in the first row of the pixel array 20 by one or more control lines $21_1$, and the left row driver 24L is connected to the pixels 2 in the second row of the pixel array 20 by one or more control lines $21_2$, and the left row driver 24L is connected to the pixels 2 in the $n^{th}$ row of the pixel array 20 by one or more control lines $21_n$. In various embodiments, the right row driver 24R is connected to the pixels 2 in each row of the plurality of rows of the pixel array 20 by the same corresponding one or more control lines for the row to which the left row driver 24L is connected. In various embodiments, the left row driver 24L and the right row driver 24R are configured to drive control signals over the control lines $21_1, 21_2, \ldots, 21_n$, such as driving transfer signals, reset signals, and row select signals to the pixels 2. In some embodiments, there is no right row driver 24R, and the left row driver 24L drives the control signals by itself.

With reference again to FIG. 3, the top ADC block 30T includes a plurality of column readout circuits 3 that are connected to receive analog pixel signals provided from corresponding pixels 2 of the pixel array 20. The bottom ADC block 30B similarly includes a plurality of column readout circuits 3 that are connected to receive analog pixel signals provided from corresponding pixels 2 of the pixel array 20. In various embodiments, the top ADC block 30T receives analog pixel signals from pixels 2 that are in even numbered columns in the pixel array 20, while the bottom ADC block 30B receives analog pixel signals from pixels 2 that are in odd numbered columns in the pixel array 20. In various other embodiments, the top ADC block 30T receives analog pixel signals from pixels 2 that are in odd numbered columns in the pixel array 20, while the bottom ADC block 30B receives analog pixel signals from pixels 2 that are in even numbered columns in the pixel array 20.

Each column readout circuit 3 in the top ADC block 30T and the bottom ADC block 30B is connected to receive analog pixel signals provided from corresponding pixels 2 of the pixel array 20, and is configured to convert the received analog pixel signals into digital pixel signals. In various embodiments, such as the embodiment illustrated in FIG. 3, each column readout line $22_1$, $22_2$, $22_3$, ..., $22_{(m-1)}$, $22_m$, is connected to a single corresponding column readout circuit 3. In various other embodiments, each column readout line may be connected to a corresponding two or more column readout circuits 3. In various embodiments, there may be one column readout circuit 3 for each column of pixels 2 in the pixel array 20, while in various other embodiments, there may be two or more column readout circuits 3 for each column of pixels 2 in the pixel array 20. In some embodiments, each of the column readout circuits 3 in the top ADC block 30T may perform processing in parallel with the other column readout circuits 3 in the top ADC block 30T. Also, in some embodiments, each of the column readout circuits 3 in the bottom ADC block 30B may perform processing in parallel with the other column readout circuits 3 in the bottom ADC block 30B. In some embodiments, each of the column readout circuits 3 in the top ADC block 30T may perform processing in parallel with each of the column readout circuits 3 in the bottom ADC block 30B.

As illustrated in FIG. 3, in various embodiments the top ADC block 30T is located to one side of the pixel array 20 such that the column readout circuits 3 of the top ADC block 30T are located to one side of the pixel array 20. Also, in various embodiments, the column readout circuits 3 of the top ADC block 30T all receive analog pixel signals that are output from a same side of the pixel array 20, and that are output in a same direction from the pixel array 20. In some embodiments, the top ADC block 30T spans a length of a row of pixels 2 in the pixel array 20. Similarly, in various embodiments the bottom ADC block 30B is located to one side of the pixel array 20 such that the column readout circuits 3 of the bottom ADC block 30B are located to one side of the pixel array 20. Also, in various embodiments, the column readout circuits 3 of the bottom ADC block 30B all receive analog pixel signals that are output from a same side of the pixel array 20, and that are output in a same direction from the pixel array 20. In some embodiments, the bottom ADC block 30B spans a length of a row of pixels 2 in the pixel array 20.

The top/left memory block 40TL is connected to receive digital pixel signals provided by corresponding column readout circuits of the plurality of column readout circuits 3 of the top ADC block 30T. The top/left memory block 40TL is controllable to store the received digital pixel signals as digital pixel values, and to output the digital pixel values as data to corresponding ports of the first plurality of ports $5a_1$, $5a_2$, $5a_3$, $5a_4$, $5a_5$, $5a_6$, $5a_7$. The top/right memory block 40TR is connected to receive digital pixel signals provided by corresponding column readout circuits of the plurality of column readout circuits 3 of the top ADC block 30T. The top/right memory block 40TR is controllable to store the received digital pixel signals as digital pixel values, and to output the digital pixel values as data to corresponding ports of the second plurality of ports $5b_1$, $5b_2$, $5b_3$, $5b_4$, $5b_5$, $5b_6$, $5b_7$. In various embodiments, the outputs from column readout circuits 3 of the top ADC block 30T that are provided to a same memory block may be multiplexed onto one or more buses to be provided to the memory block.

The bottom/left memory block 40BL is connected to receive digital pixel signals provided by corresponding column readout circuits of the plurality of column readout circuits 3 of the bottom ADC block 30B. The bottom/left memory block 40BL is controllable to store the received digital pixel signals as digital pixel values, and to output the digital pixel values as data to corresponding ports of the third plurality of ports $5c_1$, $5c_2$, $5c_3$, $5c_4$, $5c_5$, $5c_6$, $5c_7$. The bottom/right memory block 40BR is connected to receive digital pixel signals provided by corresponding column readout circuits of the plurality of column readout circuits 3 of the bottom ADC block 30B. The bottom/right memory block 40BR is controllable to store the received digital pixel signals as digital pixel values, and to output the digital pixel values as data to corresponding ports of the fourth plurality of ports $5d_1$, $5d_2$, $5d_3$, $5d_4$, $5d_5$, $5d_6$, $5d_7$. In various embodiments, the outputs from column readout circuits 3 of the bottom ADC block 30B that are provided to a same memory block may be multiplexed onto one or more buses to be provided to the memory block.

A center of the pixel array 20 may be defined as a middle of a length of a row of pixels 2 in the pixel array 20 and as a middle of a height of a column of pixels 2 in the pixel array 20. In various embodiments, the image sensor 10 may then be described with respect to the center of the pixel array 20 as having a top/left portion, a top/right portion, a bottom/left portion, and a bottom/right portion. In various embodiments, the top/left memory block 40TL is located in the top/left portion of the image sensor 10 and outputs digital signals to corresponding ports $5a_1$, $5a_2$, $5a_3$, $5a_4$, $5a_5$, $5a_6$, $5a_7$ located in the top/left portion of the image sensor 10. In various embodiments, the top/right memory block 40TR is located in the top/right portion of the image sensor 10 and outputs digital signals to corresponding ports $5b_1$, $5b_2$, $5b_3$, $5b_4$, $5b_5$, $5b_6$, $5b_7$ located in the top/right portion of the image sensor 10. In various embodiments, the bottom/left memory block 40BL is located in the bottom/left portion of the image sensor 10 and outputs digital signals to corresponding ports $5c_1$, $5c_2$, $5c_3$, $5c_4$, $5c_5$, $5c_6$, $5c_7$ located in the bottom/left portion of the image sensor 10. In various embodiments, the bottom/right memory block 40BR is located in the bottom/right portion of the image sensor 10 and outputs digital signals to corresponding ports $5d_1$, $5d_2$, $5d_3$, $5d_4$, $5d_5$, $5d_6$, $5d_7$ located in the bottom/right portion of the image sensor 10.

In various embodiments, the ports $5a_1$, $5a_2$, $5a_3$, $5a_4$, $5a_5$, $5a_6$, $5a_7$, $5b_1$, $5b_2$, $5b_3$, $5b_4$, $5b_5$, $5b_6$, $5b_7$, $5c_1$, $5c_2$, $5c_3$, $5c_4$, $5c_5$, $5c_6$, $5c_7$, $5d_1$, $5d_2$, $5d_3$, $5d_4$, $5d_5$, $5d_6$, $5d_7$ are input/output (I/O) ports, or the like, for outputting data from the image sensor 10 and, in some embodiments, further allow for inputting data into the image sensor 10. In various embodiments, the ports $5a_1$, $5a_2$, $5a_3$, $5a_4$, $5a_5$, $5a_6$, $5a_7$, $5b_1$, $5b_2$, $5b_3$, $5b_4$, $5b_5$, $5b_6$, $5b_7$, $5c_1$, $5c_2$, $5c_3$, $5c_4$, $5c_5$, $5c_6$, $5c_7$, $5d_1$, $5d_2$, $5d_3$, $5d_4$, $5d_5$, $5d_6$, $5d_7$ are Low-Voltage Differential Signaling (LVDS) ports where data is serialized from bits into serial streams with specific serialization ratio (packing) of 4:1, 6:1, 7:1, 8:1, 10:1, 12:1, or any other desired ratio. In various embodiments, there could be more or fewer ports than are shown in FIG. 3, such as 16 or 32 or 64 or 80 LVDS ports, or any other desired number of ports.

While the image sensor 10 has been illustrated in FIG. 3 with two memory blocks 40TL, 40TR connected to the top ADC block 30T and two memory blocks 40BL, 40BR connected to the bottom ADC block 30B, it should be appreciated that, in various other embodiments, more than two memory blocks may be connected to each of the top ADC block 30T and the bottom ADC block 30B, respectively. Also, in various embodiments, less than two memory blocks may be connected to each of the top ADC block 30T and the bottom ADC block 30B, respectively.

In various embodiments, the top/left ADC and memory controller 34TL includes circuitry configured to supply control signals over control lines $33_t$ to control operations of corresponding column readout circuits 3 of the top ADC block 30T, and configured to supply control signals to control an operation of the top/left memory block 40TL. In various embodiments, the top/right ADC and memory controller 34TR includes circuitry configured to supply control signals over the control lines $33_t$ to control operations of corresponding column readout circuits 3 of the top ADC block 30T, and configured to supply control signals to control an operation of the top/right memory block 40TR. In various embodiments, the bottom/left ADC and memory controller 34BL includes circuitry configured to supply control signals over control lines $33_b$ to control operations of corresponding column readout circuits 3 of the bottom ADC block 30B, and configured to supply control signals to control an operation of the bottom/left memory block 40BL. In various embodiments, the bottom/right ADC and memory controller 34BR includes circuitry configured to supply control signals over control lines $33_b$ to control operations of corresponding column readout circuits 3 of the bottom ADC block 30B, and configured to supply control signals to control an operation of the bottom/right memory block 40BR.

In some embodiments, the column readout circuits 3 of the top ADC block 30T are located between the top/left ADC and memory controller 34TL and the top/right ADC and memory controller 34TR. Also, in some embodiments, the column readout circuits 3 of the bottom ADC block 30B are located between the bottom/left ADC and memory controller 34BL and the bottom/right ADC and memory controller 34BR. While each ADC and memory controller 34TL, 34TR, 34BL, and 34BR is illustrated as a single unit, it should be appreciated that, in various embodiments, each ADC and memory controller may include an ADC controller for controlling column readout circuits, and a separate memory controller for controlling a memory block.

In some embodiments, the image sensor 10 does not include the top/right ADC and memory controller 34TR, the right row driver 24R, and the bottom/right ADC and memory controller 34BR. In such embodiments, the top/left ADC and memory controller 34TL provides control signals to the column readout circuits 3 of the top ADC block 30T over the control lines $33_t$, and provides control signals to the top/left memory block 40TL and the top/right memory block 40TR. Also, in such embodiments, the bottom/left ADC and memory controller 34BL provides control signals to the column readout circuits 3 of the bottom ADC block 30B over the control lines $33_b$, and provides control signals to the bottom/left memory block 40BL and the bottom/right memory block 40BR. Also, in such embodiments, the left row driver 24L provides control signals to the plurality of pixels 2 in the pixel array 20. It should be understood that the embodiment of the image sensor 10 in FIG. 3 is merely provided as an example and that, in various other embodiments, an image sensor with a different architecture may be employed in various embodiments of a camera. For example, some image sensors may have ports on only one side of the image sensor, while other image sensors may have ports split between two sides of the image sensors, and yet other image sensors may have ports in each corner (as in the image sensor 10 in FIG. 3).

Figure 4:
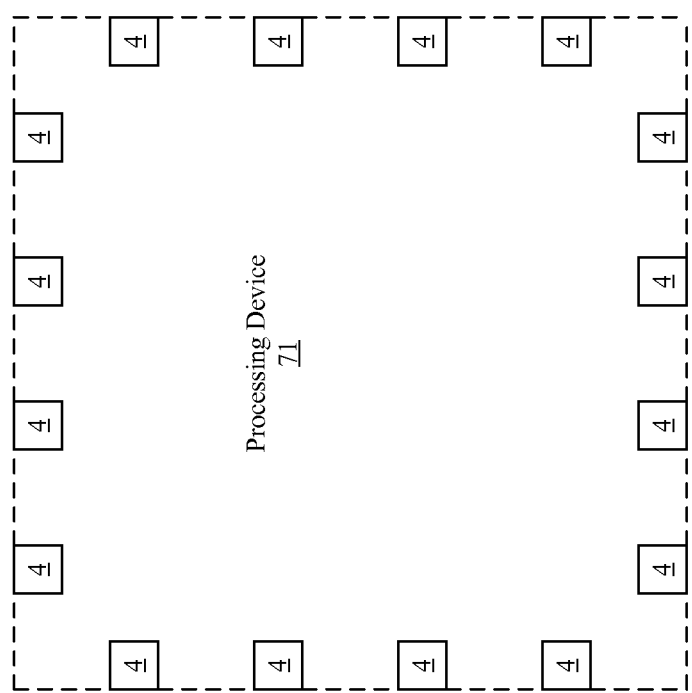
FIG. 4 illustrates a block diagram of an embodiment of a processing device.

FIG. 4 illustrates a block diagram of an embodiment of a processing device 71. The processing device 71 includes a plurality of pins 4 for inputting and/or outputting data. With reference to FIGS. 2 and 4, in various embodiments, the processing device 71a, the processing device 71b, the processing device 71c, the processing device 71d, and the processing device 75 have a similar structure as the processing device 71 with the pins 4. In various embodiments, the processing device 71a comprises a Field-Programmable Gate Array (FPGA). In some embodiments, the processing device 71a comprises a low cost FPGA, such as a Cyclone-III™ FPGA by Altera Corporation. In various embodiments, the processing device 71a comprises an FPGA with a fewer number of pins than the number of ports of the image sensor 10. In some embodiments, the processing device 71a comprises an Application Specific Integrated Circuit (ASIC). In various embodiments, the processing device 71b comprises an FPGA. In some embodiments, the processing device 71b comprises a low cost FPGA, such as a Cyclone-III™ FPGA by Altera Corporation. In various embodiments, the processing device 71b comprises an FPGA with a fewer number of pins than the number of ports of the image sensor 10. In some embodiments, the processing device 71b comprises an ASIC.

In various embodiments, the processing device 71c comprises an FPGA. In some embodiments, the processing device 71c comprises a low cost FPGA, such as a Cyclone-III™ FPGA by Altera Corporation. In various embodiments, the processing device 71c comprises an FPGA with a fewer number of pins than the number of ports of the image sensor 10. In some embodiments, the processing device 71c comprises an ASIC. In various embodiments, the processing device 71d comprises an FPGA. In some embodiments, the processing device 71d comprises a low cost FPGA, such as a Cyclone-III™ FPGA by Altera Corporation. In various embodiments, the processing device 71d comprises an FPGA with a fewer number of pins than the number of ports of the image sensor 10. In some embodiments, the processing device 71d comprises an ASIC. In various embodiments, the processing device 75 comprises an FPGA. In some embodiments, the processing device 75 comprises a low cost FPGA, such as a Cyclone-III™ FPGA by Altera Corporation. In various embodiments, the processing device 75 comprises an FPGA with a fewer number of pins than the number of ports of the image sensor 10. In some embodiments, the processing device 75 comprises an ASIC.

In various embodiments, the processing device 71a is located to an opposite side of the image sensor 10 from a side to which the processing device 71b is located. Also, in various embodiments, the processing device 71c is located to an opposite side of the image sensor 10 from a side to which the processing device 71d is located. For example, in the embodiment of FIG. 2, the processing device 71a and the processing device 71c are located to the left of the image sensor 10 while the processing device 71b and the processing device 71d are located to a right side of the image sensor 10. In the embodiment of FIG. 2, the processing device 71a, the processing device 71b, the processing device 71c, and the processing device 71d are each separate from each other.

In various embodiments, the processing device 71a is configured to perform image data pre-processing on data received from the first plurality of ports $5a_1$, $5a_2$, $5a_3$, $5a_4$, $5a_5$, $5a_6$, $5a_7$ of the image sensor 10 and to provide processed data resulting from the image data pre-processing of the data to the memory 73a. In various embodiments, the processing device 71a is configured to condition the data for storage in the memory 73a as part of the image data pre-processing. In various embodiments, the processing device 71b is configured to perform image data pre-processing on data received from the second plurality of ports $5b_1$, $5b_2$, $5b_3$, $5b_4$, $5b_5$, $5b_6$, $5b_7$ of the image sensor 10 and to provide processed data resulting from the image data pre-processing of the data to the memory 73b. In various embodiments, the processing device 71b is configured to condition the data for storage in the memory 73b as part of the image data pre-processing. In various embodiments, the processing device $71c$ is configured to perform image data pre-processing on data received from the third plurality of ports $5c_1, 5c_2, 5c_3, 5c_4, 5c_5, 5c_6, 5c_7$ of the image sensor 10 and to provide processed data resulting from the image data pre-processing of the data to the memory $73c$. In various embodiments, the processing device $71c$ is configured to condition the data for storage in the memory $73c$ as part of the image data pre-processing. In various embodiments, the processing device $71d$ is configured to perform image data pre-processing on data received from the fourth plurality of ports $5d_1, 5d_2, 5d_3, 5d_4, 5d_5, 5d_6, 5d_7$ of the image sensor 10 and to provide processed data resulting from the image data pre-processing of the data to the memory $73d$. In various embodiments, the processing device $71d$ is configured to condition the data for storage in the memory $73d$ as part of the image data pre-processing.

In various embodiments, the image data pre-processing performed by the processing devices $71a$, $71b$, $71c$, $71d$ includes processing to enhance image features and/or correct for unwanted pixel errors or distortions. In some embodiments, the image data pre-processing includes changing or modifying pixel brightness values, averaging or interpolating from neighboring pixel values to correct for distorted pixel values, eliminating or subtracting out noise, and/or the like. Of course, those are just some examples of image data pre-processing and, in various embodiments, any desired pre-processing of data can be performed by the processing devices $71a$, $71b$, $71c$, $71d$. In various embodiments, the processing device 75 is configured to retrieve data from the memory $73a$ and the memory $73b$ and the memory $73c$ and the memory $73d$ and to provide the retrieved data to the output interfaces 77 of the camera 70. In some embodiments, the processing device 75 is configured to further process the data retrieved from the memories $73a$, $73b$, $73c$, $73d$ before outputting to the output interfaces 77.

Figure 5:
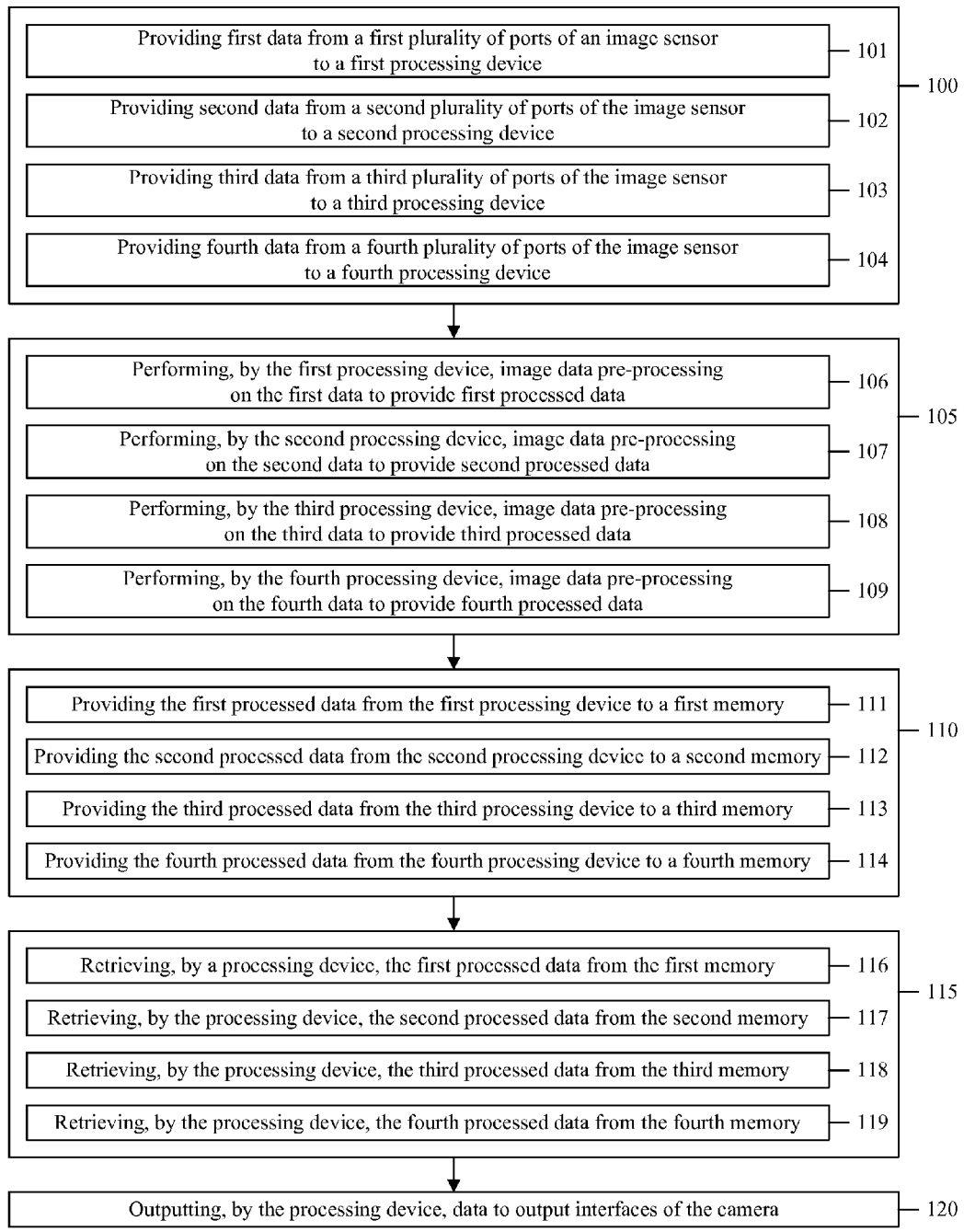
FIG. 5 illustrates a flowchart of a method in accordance with an embodiment that can be performed by the camera of FIG. 2.

FIG. 5 illustrates a flowchart of a method in accordance with an embodiment that can be performed by the camera 70 of FIG. 2. With reference to FIGS. 2 and 5, the method starts in step 100, which includes steps 101, 102, 103, and 104 that can be performed in parallel with each other. In step 101, first data is provided from a first plurality of ports of an image sensor, such as the first plurality of ports $5a_1, 5a_2, 5a_3, 5a_4, 5a_5, 5a_6, 5a_7$ of the image sensor 10, to a first processing device, such as the processing device $71a$. In step 102, second data is provided from a second plurality of ports of the image sensor, such as the second plurality of ports $5b_1, 5b_2, 5b_3, 5b_4, 5b_5, 5b_6, 5b_7$ of the image sensor 10, to a second processing device, such as the processing device $71b$. In step 103, third data is provided from a third plurality of ports of the image sensor, such as the third plurality of ports $5c_1, 5c_2, 5c_3, 5c_4, 5c_5, 5c_6, 5c_7$ of the image sensor 10, to a third processing device, such as the processing device $71c$. In step 104, first data is provided from a fourth plurality of ports of an image sensor, such as the fourth plurality of ports $5d_1, 5d_2, 5d_3, 5d_4, 5d_5, 5d_6, 5d_7$ of the image sensor 10, to a fourth processing device, such as the processing device $71d$. The method then continues to step 105.

Step 105 includes steps 106, 107, 108, and 109 that can be performed in parallel with each other. In step 106, the first processing device, such as the processing device $71a$, performs image data pre-processing on the first data to provide first processed data. In step 107, the second processing device, such as the processing device $71b$, performs image data pre-processing on the second data to provide second processed data. In step 108, the third processing device, such as the processing device $71c$, performs image data pre-processing on the third data to provide third processed data.

In step 109, the fourth processing device, such as the processing device $71d$, performs image data pre-processing on the fourth data to provide fourth processed data. The method then continues to step 110.

Step 110 includes steps 111, 112, 113, and 114 that can be performed in parallel with each other. In step 111, the first processed data is provided from the first processing device, such as the processing device $71a$, to a first memory, such as the memory $73a$. In step 112, the second processed data is provided from the second processing device, such as the processing device $71b$, to a second memory, such as the memory $73b$. In step 113, the third processed data is provided from the third processing device, such as the processing device $71c$, to a third memory, such as the memory $73c$. In step 114, the fourth processed data is provided from the fourth processing device, such as the processing device $71d$, to a fourth memory, such as the memory $73d$. The method then continues to step 115.

Step 115 includes steps 116, 117, 118, and 119 that can be performed in parallel with each other. In step 116, a processing device, such as the processing device 75, retrieves the first processed data from the first memory, such as the memory $73a$. In step 117, the processing device, such as the processing device 75, retrieves the second processed data from the second memory, such as the memory $73b$. In step 118, the processing device, such as the processing device 75, retrieves the third processed data from the third memory, such as the memory $73c$. In step 119, the processing device, such as the processing device 75, retrieves the fourth processed data from the fourth memory, such as the memory $73d$. The method then continues to step 120. In step 120, the processing device, such as the processing device 75, outputs data to the output interfaces of the camera, such as the output interfaces 77 of the camera 70. In various embodiments, the data output by the processing device 75 to the output interfaces 77 is the first processed data, the second processed data, the third processed data, and the fourth processed data, and in various other embodiments, the processing device 75 processes that data and outputs the resulting data.

Therefore, the embodiment of the camera 70 in FIG. 2 allows for having a high speed camera architecture with multiple memory blocks and multiple FPGAs or ASICs serving the data read from the image sensor and for image pre-processing. Thus, in various embodiments, if data pre-processing is needed, low-end FPGAs or ASICs can be employed between the image sensor and the memory blocks to condition the data for the memory, and to perform the image data pre-processing. While the embodiment in FIG. 2 shows four processing devices $71a$, $71b$, $71c$, $71d$ connected to the image sensor 10, it should be understood that various other embodiments may have more or fewer processing devices connected to the image sensor, such as 2, 3, 5, 6, 7, 8, or any other desired number of processing devices, and may also have as many memories as the number of processing devices. Also, while the embodiment in FIG. 2 shows one processing device 75 retrieving data from the memories, it should be understood that various other embodiments may have more processing devices, such as 2, 3, 4, or any desired number of processing devices for retrieving data from the memories.

Figure 1:
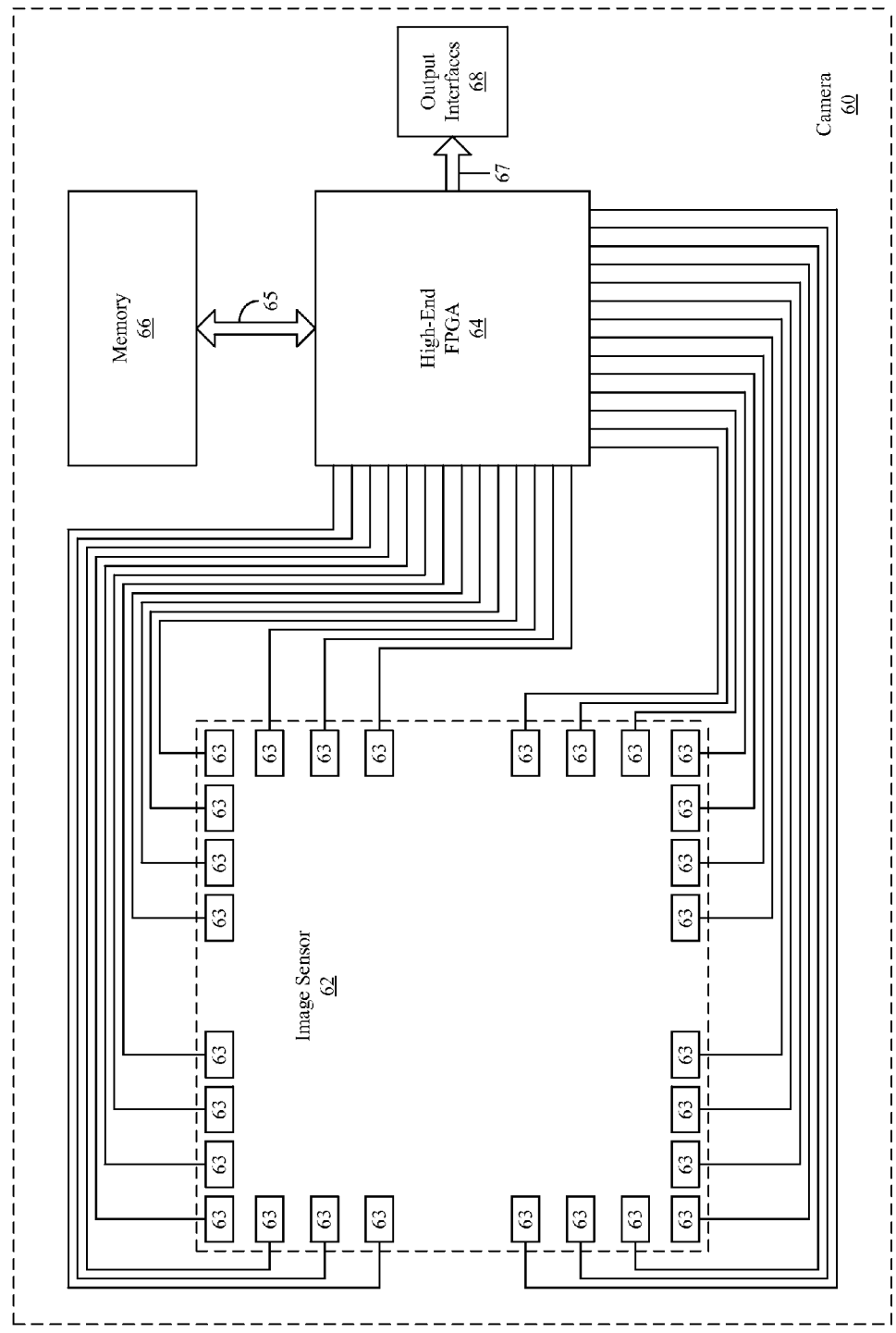
FIG. 1 illustrates the architecture of a related art high speed camera with an image sensor, a high-end FPGA configured to perform on-the-fly image pre-processing, a memory, and output interfaces.

It is instructive to examine the advantages of the embodiment of the camera 70 of FIG. 2 over the related art camera 60 of FIG. 1. In the related art camera 60, all of the outputs from the image sensor 62 are fed into the single, high-end FPGA 64, and each output of the image sensor 62 corresponds to one input pin of the high-end FPGA 64, so the high-end FPGA 64 must have a large number of input pins. Also, in the related art camera 60, there is only a single memory 66, so any increase in the bandwidth of writing to the memory would require more pins of the high-end FPGA 64 to be connected to the memory 66. The large number of pins required for the high-end FPGA 64 in the related art camera 60 is problematic because the cost of FPGAs increases significantly with an increase in a number of pins. Also, if all of the pins of an FPGA are already being used in a design, then it would not be possible to increase a bandwidth of writing to a memory, because no more pins would be available for increasing the writing bandwidth to memory.

The architecture of the camera 70 has an advantage in that each processing device 71a, 71b, 71c, 71d is only connected to a subset of the ports of the image sensor 10. Thus, for example, if each processing device 71a, 71b, 71c, 71d is implemented by an FPGA, then each FPGA could have a much smaller number of input pins than are required for the high-end FPGA 64 of the camera 60. The smaller number of pins reduces the cost of each FPGA. For example, an FPGA with enough pins to receive input from every port of an image sensor might cost on the order of $2,000, while an FPGA that only needs one-fourth of the number of input pins might cost on the order of $50, so even if four or five of the smaller FPGAs are used, there is still a significant cost advantage. Of course, those values for cost are just provided as an example, and costs for FPGAs may vary. Furthermore, by having multiple FPGAs that write to memories rather than a single FPGA writing to memory, the effective width of the memory interface is very wide, equal to the sum of the interface width of each memory interface channel, which allows for growing the camera memory multiple times as compared to the single-FPGA single-memory interface camera.

Thus, the requirement for FPGAs serving in the camera 70 with multiple FPGAs and memory blocks is greatly reduced as compared to a single high-end FPGA 64 in the related art camera 60. For example, a low cost Altera Cyclone-III™ can be used for the FPGAs in the camera 70, resulting in a low overall bill of materials of the camera 70 with multiple memory blocks serving separate image sensor outputs. As discussed above, another advantage of the multiple memory interface readout is that the effective width of the memory interface is very wide, equal to the sum of the interface width of each memory interface channel, which allows for growing the camera memory multiple times as compared to the single-FPGA single-memory interface camera. A larger memory allows for shooting a movie for a longer time, which is essential for many high-speed slow-motion camera applications.

Figure 6:
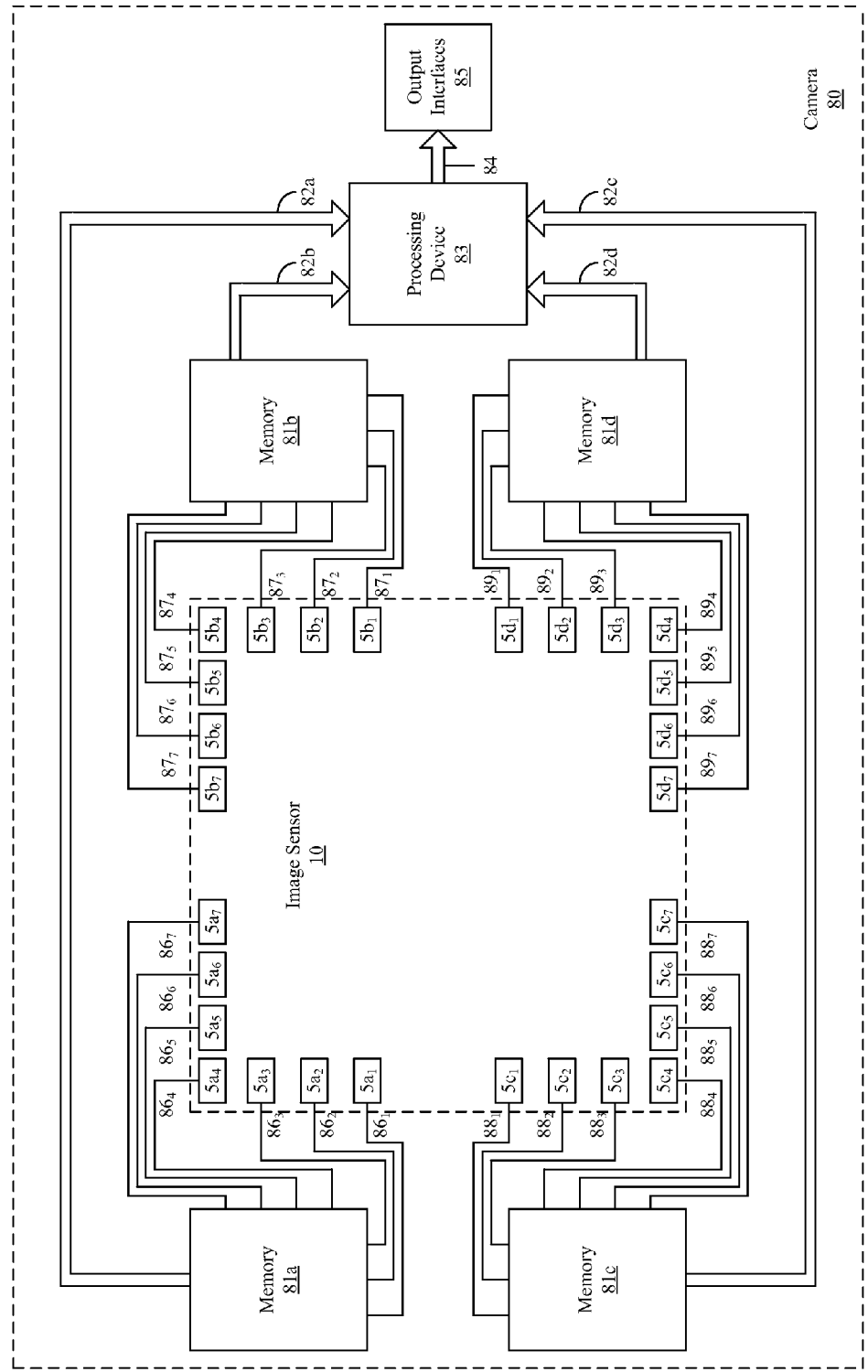
FIG. 6 illustrates a camera in accordance with an embodiment.

FIG. 6 illustrates a camera 80 in accordance with an embodiment. The camera 80 includes the image sensor 10, a memory 81a, a memory 81b, a memory 81c, a memory 81d, a processing device 83, and output interfaces 85. The image sensor 10 has the first plurality of ports $5a_1, 5a_2, 5a_3, 5a_4, 5a_5, 5a_6, 5a_7$, that are connected to the memory 81a by corresponding connections $86_1, 86_2, 86_3, 86_4, 86_5, 86_6, 86_7$, respectively. The image sensor 10 has the second plurality of ports $5b_1, 5b_2, 5b_3, 5b_4, 5b_5, 5b_6, 5b_7$, that are connected to the memory 81b by corresponding connections $87_1, 87_2, 87_3, 87_4, 87_5, 87_6, 87_7$, respectively. The image sensor 10 has the third plurality of ports $5c_1, 5c_2, 5c_3, 5c_4, 5c_5, 5c_6, 5c_7$, that are connected to the memory 81c by corresponding connections $88_1, 88_2, 88_3, 88_4, 88_5, 88_6, 88_7$, respectively. The image sensor 10 has the fourth plurality of ports $5d_1, 5d_2, 5d_3, 5d_4, 5d_5, 5d_6, 5d_7$, that are connected to the memory 81d by corresponding connections $89_1, 89_2, 89_3, 89_4, 89_5, 89_6, 89_7$, respectively.

The memory 81a is connected to the processing device 83 by a connection 82a. The memory 81b is connected to the processing device 83 by a connection 82b. The memory 81c is connected to the processing device 83 by a connection 82c. The memory 81d is connected to the processing device 83 by a connection 82d. The processing device 83 is connected to the output interfaces 85 by a connection 84. In various embodiments, each of the connections $86_1, 86_2, 86_3, 86_4, 86_5, 86_6, 86_7, 87_1, 87_2, 87_3, 87_4, 87_5, 87_6, 87_7, 88_1, 88_2, 88_3, 88_4, 88_5, 88_6, 88_7, 89_1, 89_2, 89_3, 89_4, 89_5, 89_6, 89_7$, 82a, 82b, 82c, 82d, and 84 comprises, for example, one or more wires or circuit board connections, or the like.

In various embodiments, the memory 81a is a Dynamic Random Access Memory (DRAM) type of a memory, or the like. In some embodiments, the memory 81a is a Synchronous Dynamic Random Access Memory (SDRAM) type of a memory. In various embodiments, the memory 81b is a DRAM type of a memory, or the like. In some embodiments, the memory 81b is a SDRAM type of a memory. In various embodiments, the memory 81c is a DRAM type of a memory, or the like. In some embodiments, the memory 81c is a SDRAM type of a memory. In various embodiments, the memory 81d is a DRAM type of a memory, or the like. In some embodiments, the memory 81d is a SDRAM type of a memory.

In various embodiments, the first plurality of ports $5a_1, 5a_2, 5a_3, 5a_4, 5a_5, 5a_6, 5a_7$ of the image sensor 10 comprise Stub Series Terminated Logic (SSTL) output drivers, such as SSTL-2 output drivers, SSTL-3 output drivers, or the like, for writing data directly to the memory 81a. In various embodiments, the second plurality of ports $5b_1, 5b_2, 5b_3, 5b_4, 5b_5, 5b_6, 5b_7$ of the image sensor 10 comprise SSTL output drivers, such as SSTL-2 output drivers, SSTL-3 output drivers, or the like, for writing data directly to the memory 81b. In various embodiments, the third plurality of ports $5c_1, 5c_2, 5c_3, 5c_4, 5c_5, 5c_6, 5c_7$ of the image sensor 10 comprise SSTL output drivers, such as SSTL-2 output drivers, SSTL-3 output drivers, or the like, for writing data directly to the memory 81c. In various embodiments, the fourth plurality of ports $5d_1, 5d_2, 5d_3, 5d_4, 5d_5, 5d_6, 5d_7$ of the image sensor 10 comprise SSTL output drivers, such as SSTL-2 output drivers, SSTL-3 output drivers, or the like, for writing data directly to the memory 81d.

In various embodiments, the memory 81a is located to an opposite side of the image sensor 10 from a side to which the memory 81b is located. Also, in various embodiments, the memory 81c is located to an opposite side of the image sensor 10 from a side to which the memory 81d is located. For example, in the embodiment of FIG. 6, the memory 81a and the memory 81c are located to the left of the image sensor 10 while the memory 81b and the memory 81d are located to a right side of the image sensor 10. In the embodiment of FIG. 6, the memory 81a, the memory 81b, the memory 81c, and the memory 81d are each separate from each other.

In various embodiments, the processing device 83 is configured to retrieve data from the memory 81a and the memory 81b and the memory 81c and the memory 81d and to provide the retrieved data to the output interfaces 85 of the camera 80. In some embodiments, the processing device 83 is configured to further process the data retrieved from the memories 81a, 81b, 81c, 81d, such as by performing image data pre-processing, before outputting to the output interfaces 85. In various embodiments, the processing device 83 is an FPGA. In some embodiments, the processing device 83 is an ASIC.

While the embodiment in FIG. 6 shows four memories 81a, 81b, 81c, 81d connected to the image sensor 10, it should be understood that various other embodiments may have more or fewer memories connected to the image sensor, such as 1, 2, 3, 5, 6, 7, 8, or any other desired number of memories. Also, while the embodiment in FIG. 6 shows one processing device 83 retrieving data from the memories, it should be understood that various other embodiments may have more processing devices, such as 2, 3, 4, or any desired number of processing devices for retrieving data from the memories.

Therefore, FIG. 6 illustrates a camera architecture in accordance with an embodiment where the camera memory is split into multiple parallel memory blocks receiving input from separate groups of the image sensor ports. Also, as mentioned above, the image sensor may have SSTL output drivers, such as SSTL-2 or SSTL-3 output drivers, to be able to write data into SDRAM type of a memory. The embodiment of the camera 80 of FIG. 6 provides for a high speed camera architecture where the image sensor is capable to write directly to the memory.

Figure 7A:
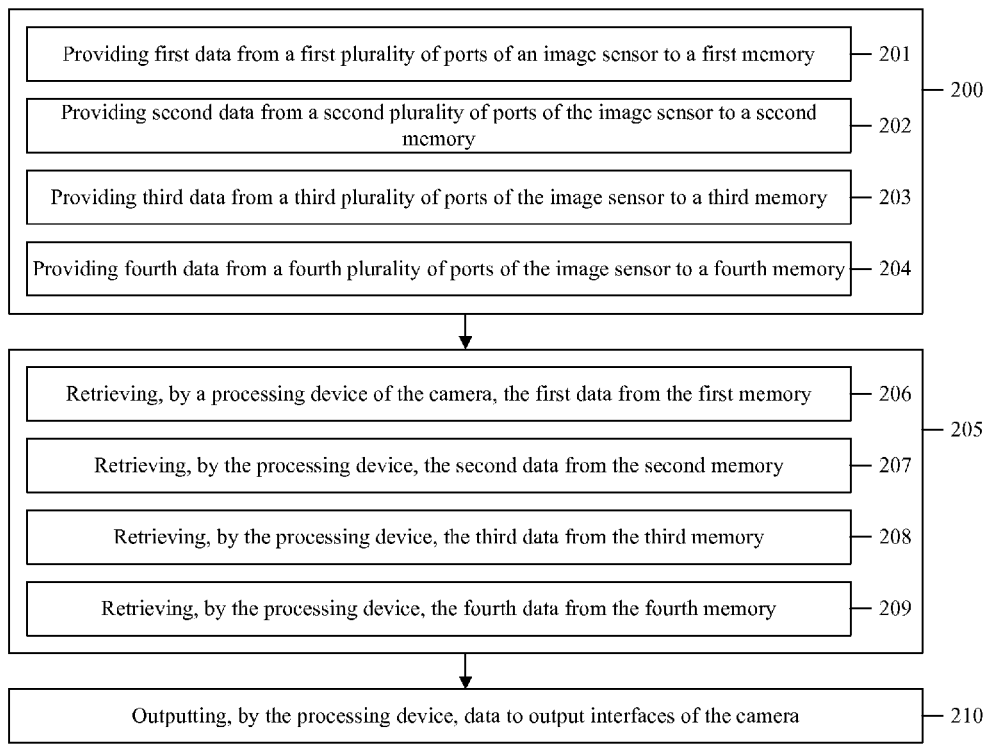
FIG. 7A illustrates a flowchart of a method in accordance with an embodiment that can be performed by the camera of FIG. 6.

FIG. 7A illustrates a flowchart of a method in accordance with an embodiment that can be performed by the camera 80 of FIG. 6. With reference to FIGS. 6 and 7A, the method starts in step 200, which includes steps 201, 202, 203, and 204 that can be performed in parallel with each other. In step 201, first data from a first plurality of ports of an image sensor, such as the first plurality of ports $5a_1$, $5a_2$, $5a_3$, $5a_4$, $5a_5$, $5a_6$, $5a_7$ of the image sensor 10, is provided to a first memory, such as the memory 81a. In step 202, second data from a second plurality of ports of an image sensor, such as the second plurality of ports $5b_1$, $5b_2$, $5b_3$, $5b_4$, $5b_5$, $5b_6$, $5b_7$ of the image sensor 10, is provided to a second memory, such as the memory 81b. In step 203, third data from a third plurality of ports of an image sensor, such as the third plurality of ports $5c_1$, $5c_2$, $5c_3$, $5c_4$, $5c_5$, $5c_6$, $5c_7$ of the image sensor 10, is provided to a third memory, such as the memory 81c. In step 204, fourth data from a fourth plurality of ports of an image sensor, such as the fourth plurality of ports $5d_1$, $5d_2$, $5d_3$, $5d_4$, $5d_5$, $5d_6$, $5d_7$ of the image sensor 10, is provided to a fourth memory, such as the memory 81d. The method then continues to step 205.

Step 205 includes steps 206, 207, 208, and 209 that can be performed in parallel with each other. In step 206, a processing device, such as the processing device 83, retrieves the first data from the first memory, such as the memory 81a. In step 207, the processing device, such as the processing device 83, retrieves the second data from the second memory, such as the memory 81b. In step 208, the processing device, such as the processing device 83, retrieves the third data from the third memory, such as the memory 81c. In step 209, the processing device, such as the processing device 83, retrieves the fourth data from the fourth memory, such as the memory 81d. The method then continues to step 210.

In step 210, the processing device 83 outputs data to the output interfaces 85 of the camera 80. In various embodiments, the data output by the processing device 83 is the first data, the second data, the third data, and the fourth data that the processing device 83 retrieved from the memories 81a, 81b, 81c, and 81d, respectively. In some embodiments, the data output by the processing device 83 is the result of image data pre-processing performed by the processing device 83 on the first data, the second data, the third data, and the fourth data that the processing device 83 retrieved from the memories 81a, 81b, 81c, and 81d, respectively.

Figure 7B:
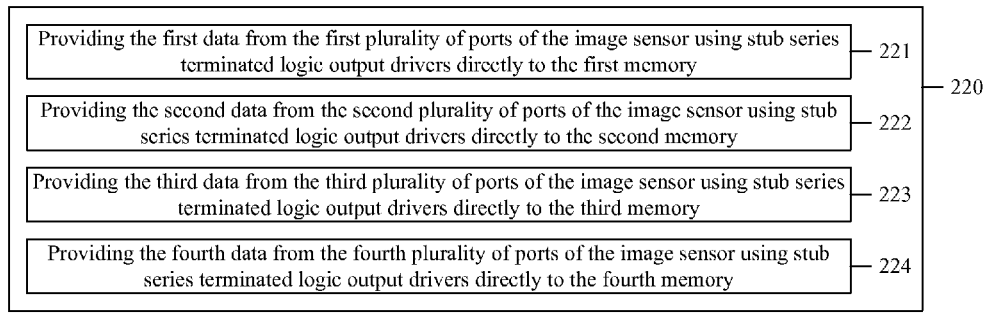
FIG. 7B illustrates a method that can be performed as part of the method of FIG. 7A.

FIG. 7B illustrates a method in a step 220 that could be used for the step 200 of the method of FIG. 7A. Step 220 includes steps 221, 222, 223, and 224 that can be performed in parallel with each other. In step 221, the first data from the first plurality of ports of the image sensor, such as the first plurality of ports $5a_1$, $5a_2$, $5a_3$, $5a_4$, $5a_5$, $5a_6$, $5a_7$ of the image sensor 10, is provided using stub series terminated logic output drivers directly to the first memory, such as the memory 81a. In step 222, the second data from the second plurality of ports of the image sensor, such as the second plurality of ports $5b_1$, $5b_2$, $5b_3$, $5b_4$, $5b_5$, $5b_6$, $5b_7$ of the image sensor 10, is provided using stub series terminated logic output drivers directly to the second memory, such as the memory 81b. In step 223, the third data from the third plurality of ports of the image sensor, such as the third plurality of ports $5c_1$, $5c_2$, $5c_3$, $5c_4$, $5c_5$, $5c_6$, $5c_7$ of the image sensor 10, is provided using stub series terminated logic output drivers directly to the third memory, such as the memory 81c. In step 224, the fourth data from the fourth plurality of ports of the image sensor, such as the fourth plurality of ports $5d_1$, $5d_2$, $5d_3$, $5d_4$, $5d_5$, $5d_6$, $5d_7$ of the image sensor 10, is provided using stub series terminated logic output drivers directly to the fourth memory, such as the memory 81d.

The embodiments disclosed herein are to be considered in all respects as illustrative, and not restrictive of the invention. The present invention is in no way limited to the embodiments described above. Various modifications and changes may be made to the embodiments without departing from the spirit and scope of the invention. Various modifications and changes that come within the meaning and range of equivalency of the claims are intended to be within the scope of the invention.

What is claimed is:
1. A camera, comprising:
 a first processing device;
 a second processing device; and
 an image sensor comprising:
  a pixel array comprising a plurality of pixels;
  a plurality of readout circuits connected to the pixel array that are configured to convert analog pixel signals into digital pixel signals;
  a plurality of memories that are each connected to receive output from a corresponding one or more of the plurality of readout circuits;
  a first plurality of ports connected to a corresponding one or more of the plurality of memories; and
  a second plurality of ports connected to a corresponding one or more of the plurality of memories;
 wherein the first plurality of ports are connected to provide output from the image sensor to the first processing device and the second plurality of ports are connected to provide output from the image sensor to the second processing device; and
 wherein the first processing device and the second processing device to which the image sensor is directly connected to provide output to each have a fewer number of pins that are configured to receive input than a total number of ports of the image sensor.
2. The camera of claim 1,
 wherein the first processing device comprises a field-programmable gate array; and
 wherein the second processing device comprises a field-programmable gate array.

3. The camera of claim 1,
wherein the first processing device comprises an application specific integrated circuit; and
wherein the second processing device comprises an application specific integrated circuit.

4. The camera of claim 1,
wherein the first processing device is located to an opposite side of the image sensor from a side to which the second processing device is located.

5. The camera of claim 1, further comprising:
a first memory connected to the first processing device; and
a second memory connected to the second processing device.

6. The camera of claim 5,
wherein the first processing device is configured to perform image data pre-processing on first data received from the first plurality of ports of the image sensor and to provide first processed data resulting from the image data pre-processing of the first data to the first memory; and
wherein the second processing device is configured to perform image data pre-processing on second data received from the second plurality of ports of the image sensor and to provide second processed data from the image data pre-processing of the second data to the second memory.

7. The camera of claim 5, further comprising:
a processing device connected to the first memory and to the second memory and to output interfaces of the camera.

8. The camera of claim 7,
wherein the processing device is configured to retrieve data from the first memory and the second memory and to provide the retrieved data to the output interfaces of the camera.

9. The camera of claim 1, further comprising:
a third processing device; and
a fourth processing device;
wherein the image sensor further comprises a third plurality of ports connected to the third processing device and a fourth plurality of ports connected to the fourth processing device.

10. The camera of claim 9,
wherein the first plurality of ports are located at a top-left portion of the image sensor;
wherein the second plurality of ports are located at a top-right portion of the image sensor;
wherein the third plurality of ports are located at a bottom-left portion of the image sensor; and
wherein the fourth plurality of ports are located at a bottom-right portion of the image sensor.

11. The camera of claim 9, further comprising:
a first memory connected to the first processing device;
a second memory connected to the second processing device;
a third memory connected to the third processing device; and
a fourth memory connected to the fourth processing device.

12. The camera of claim 11,
wherein the first processing device is configured to perform image data pre-processing on first data received from the first plurality of ports of the image sensor and to provide first processed data resulting from the image data pre-processing of the first data to the first memory;
wherein the second processing device is configured to perform image data pre-processing on second data received from the second plurality of ports of the image sensor and to provide second processed data resulting from the image data pre-processing of the second data to the second memory;
wherein the third processing device is configured to perform image data pre-processing on third data received from the third plurality of ports of the image sensor and to provide third processed data resulting from the image data pre-processing of the third data to the third memory; and
wherein the fourth processing device is configured to perform image data pre-processing on fourth data received from the fourth plurality of ports of the image sensor and to provide fourth processed data resulting from the image data pre-processing of the fourth data to the fourth memory.

13. The camera of claim 11, further comprising:
a processing device connected to the first memory and to the second memory and to the third memory and to the fourth memory and to output interfaces of the camera.

14. The camera of claim 13,
wherein the processing device is configured to retrieve data from the first memory and the second memory and the third memory and the fourth memory and to provide the retrieved data to the output interfaces of the camera.

15. The camera of claim 9,
wherein the first processing device comprises a field-programmable gate array with fewer number of pins than the number of ports of the image sensor.

16. The camera of claim 1,
wherein the first plurality of ports are connected to provide digital pixel signals as output from the image sensor to one or more pins of the first processing device.

17. The camera of claim 1,
wherein the corresponding one or more of the plurality of memories that are connected to the first plurality of ports are configured to provide digital pixel signals to the first plurality of ports to be provided to the first processing device.

18. The camera of claim 1,
wherein the first plurality of ports are connected to provide digital signals as output from the image sensor to the first processing device.

19. The camera of claim 1,
wherein the first processing device is configured to receive digital data from the image sensor and to store processed digital data in a synchronous dynamic random access memory.

20. The camera of claim 1,
wherein the first processing device and the second processing device are configured such that the first processing device receives digital data from the first plurality of ports of the image sensor while at a same time the second processing device receives digital data from the second plurality of ports of the image sensor.

21. A method in a camera, the camera comprising a first processing device, a second processing device, and an image sensor that comprises a pixel array, a plurality of readout circuits, a plurality of memories, a first plurality of ports, and a second plurality of ports, the method comprising:
converting, by the plurality of readout circuits, analog pixel signals output from the pixel array into digital pixel signals;

storing, by each of the plurality of memories, outputs from a corresponding one or more of the plurality of readout circuits;

providing first data to the first plurality of ports of the image sensor from a corresponding one or more of the plurality of memories, and from the first plurality of ports of the image sensor to the first processing device; and providing second data to the second plurality of ports of the image sensor from a corresponding one or more of the plurality of memories, and from the second plurality of ports of the image sensor to the second processing device;

wherein the first processing device and the second processing device to which the image sensor is directly connected to provide output to each have a fewer number of pins that are configured to receive input than a total number of ports of the image sensor.

22. The method of claim 21, further comprising:
performing, by the first processing device, image data pre-processing on the first data to provide first processed data; and
performing, by the second processing device, image data pre-processing on the second data to provide second processed data.

23. The method of claim 22, further comprising:
providing the first processed data from the first processing device to a first memory; and
providing the second processed data from the second processing device to a second memory.

24. The method of claim 23, further comprising:
retrieving, by a processing device, the first processed data from the first memory; and
retrieving, by the processing device, the second processed data from the second memory.

25. The method of claim 21, further comprising:
providing third data from a third plurality of ports of the image sensor to a third processing device; and
providing fourth data from a fourth plurality of ports of the image sensor to a fourth processing device.

26. The method of claim 25, further comprising:
performing, by the first processing device, image data pre-processing on the first data to provide first processed data;
performing, by the second processing device, image data pre-processing on the second data to provide second processed data;
performing, by the third processing device, image data pre-processing on the third data to provide third processed data; and
performing, by the fourth processing device, image data pre-processing on the fourth data to provide fourth processed data.

27. The method of claim 26, further comprising:
providing the first processed data from the first processing device to a first memory;
providing the second processed data from the second processing device to a second memory;
providing the third processed data from the third processing device to a third memory; and
providing the fourth processed data from the fourth processing device to a fourth memory.

28. The method of claim 27, further comprising:
retrieving, by a processing device, the first processed data from the first memory;
retrieving, by the processing device, the second processed data from the second memory;

retrieving, by the processing device, the third processed data from the third memory; and
retrieving, by the processing device, the fourth processed data from the fourth memory.

29. A camera, comprising:
a first memory;
a second memory; and
an image sensor comprising:
  a pixel array comprising a plurality of pixels;
  a plurality of readout circuits connected to the pixel array that are configured to convert analog pixel signals into digital pixel signals;
  a plurality of memories that are each connected to receive output from a corresponding one or more of the plurality of readout circuits;
  a first plurality of ports connected to a corresponding one or more of the plurality of memories; and
  a second plurality of ports connected to a corresponding one or more of the plurality of memories;
wherein the first plurality of ports are directly connected to the first memory to provide output from the image sensor directly to the first memory and the second plurality of ports are directly connected to the second memory to provide output from the image sensor directly to the second memory.

30. The camera of claim 29,
wherein the first memory comprises a synchronous dynamic random access memory; and
wherein the second memory comprises a synchronous dynamic random access memory.

31. The camera of claim 29,
wherein the first plurality of ports of the image sensor comprise stub series terminated logic output drivers for writing data directly to the first memory; and
wherein the second plurality of ports of the image sensor comprise stub series terminated logic output drivers for writing data directly to the second memory.

32. The camera of claim 29,
wherein the first memory is located to an opposite side of the image sensor from a side to which the second memory is located.

33. The camera of claim 29, further comprising:
a processing device connected to the first memory and to the second memory and to output interfaces of the camera.

34. The camera of claim 29, further comprising:
a third memory; and
a fourth memory;
wherein the image sensor further comprises a third plurality of ports connected to the third memory and a fourth plurality of ports connected to the fourth memory.

35. The camera of claim 34, further comprising:
a processing device configured to retrieve data from the first memory and the second memory and the third memory and the fourth memory and to provide the retrieved data to output interfaces of the camera.

36. The camera of claim 29,
wherein the corresponding one or more of the plurality of memories that are connected to the first plurality of ports are configured to provide digital pixel signals to the first plurality of ports to be provided to the first memory.

37. The camera of claim 29,
wherein the image sensor is distinct from the first memory and the second memory.

38. The camera of claim 29, wherein the corresponding one or more of the plurality of memories that are connected to the first plurality of ports are configured to provide output to the first memory through the first plurality of ports.

39. A method in a camera, the camera comprising a first memory, a second memory, and an image sensor that comprises a pixel array, a plurality of readout circuits, a plurality of memories, a first plurality of ports, and a second plurality of ports, the method comprising:
   converting, by the plurality of readout circuits, analog pixel signals output from the pixel array into digital pixel signals;
   storing, by each of the plurality of memories of the image sensor, outputs from a corresponding one or more of the plurality of readout circuits;
   providing first data to the first plurality of ports of the image sensor from a corresponding one or more of the plurality of memories of the image sensor, and from the first plurality of ports of the image sensor directly to the first memory; and
   providing second data to the second plurality of ports of the image sensor from a corresponding one or more of the plurality of memories of the image sensor, and from the second plurality of ports of the image sensor directly to the second memory.

40. The method of claim 39, wherein providing the first data comprises providing the first data from the first plurality of ports of the image sensor using stub series terminated logic output drivers directly to the first memory.

41. The method of claim 39, further comprising:
   providing third data from a third plurality of ports of the image sensor to a third memory; and
   providing fourth data from a fourth plurality of ports of the image sensor to a fourth memory.

42. The method of claim 41, further comprising:
   retrieving, by a processing device of the camera, the first data from the first memory;
   retrieving, by the processing device, the second data from the second memory;
   retrieving, by the processing device, the third data from the third memory; and
   retrieving, by the processing device, the fourth data from the fourth memory.

\* \* \* \* \*